United States Patent [19]
Kawashima et al.

[11] Patent Number: 5,753,369
[45] Date of Patent: May 19, 1998

[54] POWER TRANSMISSION BELT

[75] Inventors: Masahiko Kawashima; Koji Kitahama, both of Hyogo; Kyoichi Mishima, Suzurandaihigashi-machi, all of Japan

[73] Assignee: Mitsuboshi Belting Ltd., Kobe, Japan

[21] Appl. No.: 507,571

[22] Filed: Jul. 26, 1995

Related U.S. Application Data

[63] Continuation-in-part of Ser. No. 356,143, Dec. 15, 1994, Pat. No. 5,498,213.

[30] Foreign Application Priority Data

Jul. 27, 1994 [JP] Japan .................... 6-196013

[51] Int. Cl.⁶ .................... A23B 55/00; F16G 5/00
[52] U.S. Cl. .................... 428/396; 428/357; 428/359; 428/361; 428/364; 428/367; 428/397; 474/205; 474/265; 474/267

[58] Field of Search .................... 474/205, 267, 474/265; 428/366, 396, 357, 359, 361, 364, 367, 397

[56] References Cited

PUBLICATIONS

Rubber Products Manufacturing Technology, V–Belt and Fan Belt Manufacturing Technology, Fukuda et al., pp. 593–600 and 648–649, 1994.

*Primary Examiner*—Richard Weisberger
*Attorney, Agent, or Firm*—Wood, Phillips, VanSanten, Clark & Mortimer

[57] ABSTRACT

A power transmission belt having a body with a length, inside, and outside, and laterally spaced side surfaces. The body has a compression section, with there being a plurality of fibers embedded in the compression section having a diameter of 0.7 to 0.9 denier.

20 Claims, 3 Drawing Sheets

POWER TRANSMISSION BELT

CROSS-REFERENCE

This application is a continuation-in-part of application Ser. No. 08/356,143, entitled "Power Transmission Belt", filed Dec. 15, 1994, now U.S. Pat. No. 5,498,213.

BACKGROUND OF THE INVENTION

1. Field of the Invention

This invention relates to power transmission belts and, more particularly, to a power transmission belt having laterally extending, reinforcing fibers embedded therein.

2. Background Art

It is well known to construct power transmission belts with one or more V-shaped ribs to engage a cooperating pulley having complementary grooves. The V-ribbed belt is generally thinner than a single rib V-belt, thereby making it more flexible. Accordingly, the V-ribbed belt is particularly suitable for use in systems having small diameter pulleys, thereby permitting reduction in the size of components in such systems. By reducing pulley size, reduction in the size of the belt drive components is made possible. As a result, manufacturing and operating costs may likewise be reduced.

Another advantage of the V-ribbed belt is that the tension of the belt is maintained by reason of the fact that the belt ribs are wedged into mating grooves on a cooperating pulley during operation. This lengthens the overall belt life.

As a result of these desirable features, the use of the V-ribbed has expanded to many fields, among which are general industries, the automotive industry, the agricultural industry, the household appliance industry, and others.

In one conventional V-ribbed belt, the body of the belt has a plurality of laterally spaced, V-shaped ribs extending longitudinally of the belt and integrally formed on the inside of the body. A plurality of laterally spaced, load carrying cords are embedded in a cushion rubber layer and define the belt neutral axis. One or more rubber impregnated canvas layers are applied to the outside of the body, which is in tension during operation. Alternatively, a rubber layer can be exposed on the outside of the belt body, without the need for a covering canvas layer.

One conventional V-ribbed belt has short aramid fibers embedded in a rubber layer that is in compression during operation. The lengths of the fibers align widthwise of the belt and have a thickness of 1.5 to 2.0 denier. These fibers reinforce the belt against lateral pressure in use.

Further, the embedded fibers are exposed at the lateral surfaces of the ribs which contact cooperating pulleys. These fibers improve the wear resistance of the belt.

The above V-ribbed belts have some inherent problems. When the above type of belt is employed with a flex-back pulley having a diameter of 50–75 mm, cracks may generate in a relatively short period of time.

SUMMARY OF THE INVENTION

In one form of the invention, a power transmission belt is provided having a body with a length, inside, and outside, and laterally spaced side surfaces. The body has a compression section, with there being a plurality of fibers embedded in the compression section having a diameter of 0.7 to 0.9 denier.

With the present invention, it is possible to provide lateral reinforcement to the belt while facilitating bending of the belt around relatively small diameter pulleys without premature crack generation. The space between the relatively small diameter fibers is widened when the belt is flexed back on a small pulley. The fibers provide little resistance to bending in the compression rubber, reducing the likelihood of crack generation at the bottom of the ribs.

As a result, systems with which this type of belt is used may be made with small diameter pulleys. By reducing component size, system manufacturing and operating costs can be kept relatively low.

In one form, the compression section is made of hydrogenated nitrile rubber in which the fibers are embedded.

The fibers may be aramid fibers.

In one form, the power transmission belt is a V-ribbed belt.

A load carrying member may be provided on the body and extends in a lengthwise direction. The load carrying member is embedded in a cushion rubber layer to define the belt neutral axis. The cushion rubber layer may be one, or a blend, of natural rubber (OR), styrene-butadiene rubber (SBR), chloroprene rubber (CR), nitrile rubber (NBR), hydrogenated nitrile rubber (HNBR), chlorosulphonated polyethylene rubber (CSM), and polyurethane.

In one form, the fibers have lengths that are directed laterally of the belt body.

The fibers may be present in an amount of 5–15 parts by weight of fiber per 100 parts by weight of rubber in which they are embedded.

In one form, the fibers have a length of 1–3 mm.

In another form, a power transmission belt is provided having a body with a length, an inside, an outside, and laterally spaced side surfaces. There are a plurality of laterally spaced ribs on the body extending lengthwise of the body. A plurality of fibers are provided in the ribs and have a diameter of 0.7 to 0.9 denier.

The ribs may be made of hydrogenated nitrile rubber in which rubber the fibers are embedded.

DETAILED DESCRIPTION OF THE DRAWINGS

Figure 1:
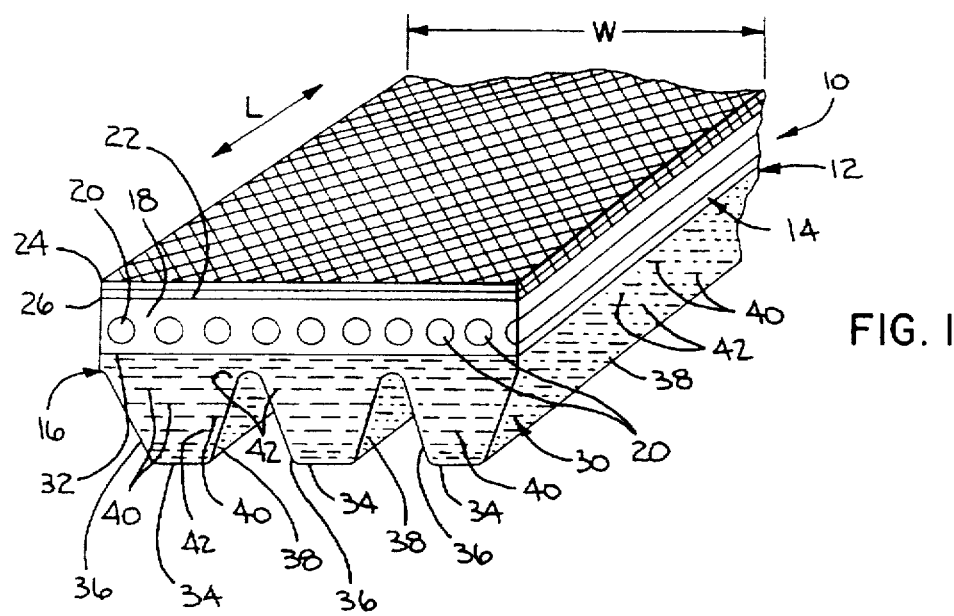
FIG. 1 is a fragmentary perspective view of a V-ribbed power transmission belt made according to the present invention.

In FIG. 1, a V-ribbed belt is shown at 10, with the present invention incorporated therein. It should be understood that the inventive concept can be practiced in other types of belts, i.e. a V-belt or other belt utilizing oppositely facing side surfaces to frictionally engage a cooperating pulley. The belt 10 has a body 12 with a length in the direction of the double-headed arrow L and a width W between two laterally oppositely facing surfaces 14, 16.

The belt 10 has a cushion rubber layer 18 within which longitudinally extending, load carrying cords 20 are embedded. The cushion rubber layer 18 is preferably formed from at least one of CR, NBR, H-NBR, CSM, NR, SBR, BR, or the like. The outside surface 22 of the cushion rubber body 12 is covered by one, and in this case two, canvas sheets 24, 26.

The load carrying cords 20, embedded in the cushion rubber layer 18, are constructed to have high strength and good resistance to elongation.

A compression rubber section/layer 30 is formed on the bottom surface 32 of the cushion rubber layer 18. The compression rubber layer 30 can be made from the same type of rubber as makes up the cushion rubber layer 18.

The compression rubber layer 30 has a plurality, and in this case three, longitudinally extending, V-shaped ribs 34. Each of the ribs 34 has laterally oppositely facing, pulley-engaging side surfaces 36,38. It is these surfaces 36,38 that frictionally engage cooperating pulleys to cause the belt 10 to drive and be driven by the cooperating pulleys.

Short aramid fibers are embedded in the compression rubber layer 30, and principally in the ribs 34, to provide lateral reinforcement. These aramid fibers consist of para- and/or meta-type aramid fibers 40 and pulp-like para-type aramid fibers 42, with the fibers 40 extending substantially in the lateral direction and the fibers 42 being randomly oriented.

The para- and/or meta-type aramid fibers 40 preferably have a length of 2–10 mm and are present in an amount of 5–10 weight parts per 100 weight parts of rubber.

The pulp-like para-type aramid fibers 42 have a length that is not greater than 2 mm. More preferably, 80% or more of these fibers 42 have a length that does not exceed 1 mm. The pulp-like para-type aramid fibers 42 are present in an amount of 1–5 weight parts per 100 weight parts of rubber.

The fibers 40, 42 are incorporated so that they have portions that protrude from the pulley-engaging side surfaces 36, 38. Preferably, the projection of at least the para- and/or meta-type aramid fibers 40 is sufficient that the projecting portions of the fibers 40 can bend against the side surfaces 36, 38 in operation as they contact a cooperating pulley.

When the length of the fibers 40 is less than 2 mm, the fibers 40 do not provide the necessary lateral reinforcement. On the other hand, when the length of the fibers exceeds 10 mm, the fibers 40 become entangled with each other during the kneading process. This results in fiber clusters which remain intact in the rubber. These fiber clusters are not easily untangled during the subsequent kneading, rolling, etc. steps and remain in the vulcanized rubber, thereby causing localized weakening and making the belt prone to cracking.

The pulp-like para-type aramid fibers 42 have the length described above in that fibers of greater length tend to inhibit bending of the belt. Characterization of the para-type fibers 42 as "pulp-like" means that the fibers have a multitude of whisker-like fine fibers, having a length of approximately 1–2 mm, projecting therefrom. This texture can be achieved by rubbing para-type aramid fibers using a known technique so as to fibrillate the exposed surface of the fibers. These whisker-like fine fibers can be generated by treating para-type aramid fibers, but cannot be generated effectively using meta-type aramid fibers.

Examples of suitable para-type aramid fibers are polyparaphenylene isophthalamide, fibers sold commercially by DuPont under the trademark KEVLAR™, fibers sold commercially by Teijin under the trademark TECHNORA™, and fibers sold commercially by Enka of Holland under the trademark TWARON™.

One suitable meta-type aramid short fiber is polymetaphenylene isophthalamide, fibers sold commercially by Teijin Ltd. under the trademark CONEX™, and fibers sold commercially by DuPont under the trademark NOMEX™.

The whisker-like fine fibers on the pulp-like short fibers 42 are rooted principally in the compression rubber layer 30 and reinforce the side surfaces 36, 38 on the belt 10. At the same time, these fibers 42 cooperate with the fibers 40 to provide a unique effect.

More particularly, the para- and/or meta-type aramid fibers 40 protruding from the side surfaces 36, 38, upon being bent by a cooperating pulley against the side surfaces 36, 38, are prevented by the pulp-like para-type aramid fibers 42 from being embedded in the rubber on the side surfaces 36, 38. With the belt 10 initially at high tension, the exposed fibers 40, 42 prevent excessive wear and sticking between the belt side surfaces 36, 38 and a cooperating pulley. After continuous running, the bent portions of the fibers 40, which cannot penetrate the side surfaces 36, 38, sever by reason of the friction between the belt and cooperating pulleys, thereby exposing more of the elastomeric material to increase the coefficient of friction between the belt 10 and a cooperating pulley.

The following testing demonstrates the advantages of the invention. For purposes of this testing, a V-ribbed belt construction was utilized.

Inventive Belt

A V-ribbed belt 10 (3PK1100) was made having incorporated therein 10 parts by weight of meta-type aramid fiber 40 with a length of 3 mm. 5 parts by weight of pulp-like para-type aramid fibers 42 was incorporated for each 100 parts by weight of rubber.

Comparative Belt A

This belt was constructed by incorporating 10 parts by weight of short meta-type aramid fibers, with a length of 3 mm, per 100 parts by weight of rubber.

Comparative Belt B

This belt was constructed by incorporating 15 parts by weight of short meta-type aramid fibers, with a length of 3 mm, per 100 parts by weight of rubber.

Tackiness Test

Figure 2:
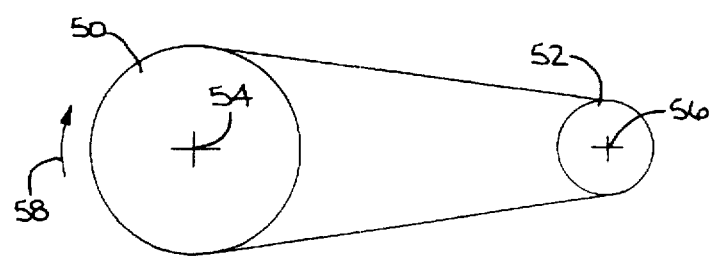
FIG. 2 is a schematic representation of a system for dynamically testing belt sticking with the belt under high tension.

Each of the V-ribbed belts was trained around a system as shown in FIG. 2 including a drive pulley 50 and a driven pulley 52 spaced from each other and rotatable about parallel axes 54, 56 respectively. The drive pulley 50 had a 170 mm diameter, while the driven pulley 52 had a 72 mm diameter. The belts were run for 20 minutes while varying the tension on the belt. The drive pulley 50 was rotated in the direction of the arrow 58 at a speed of 2000 rpm.

The results of the tests are shown in Table 1, below.

TABLE 1

| Mounting Tension (kgf/rib) | 15 | 20 | 25 | 30 |
|---|---|---|---|---|
| Inventive Belt | o | o | o | o |
| Comparative Belt | | | | |
| A | o | o | x | x |
| B | o | o | o | x |

As can be seen from the test results, when the belt tension was low, there was no tackiness problem with any of the belts. When the belt tension was increased, no problem was observed with the inventive belt. However, both of the conventional belts had some observable tackiness at the higher tensions.

Power Transmission Test

In a conventional belt, when aramid fibers are incorporated so as to protrude from the belt side surfaces, the frictional forces between the belt and cooperating pulleys is reduced over what they would be in the absence of the protruding fibers. When belt tension decreases after an extended period of running, reduction in power transmission efficiency results by reason of slippage. Unwanted noise is generated.

On the other hand, with the inventive belt, the short fibers 40 cannot bury in the side surfaces 36, 38 in the compression rubber layer, regardless of the running time, due to the presence of the whiskers of the pulp-like fibers 42 in the compression rubber layer 30. As a result, the bent protruding portions of the fibers 40 are ultimately severed from the side surfaces 36, 38 by reason of the frictional forces between the belt 10 and cooperating pulleys. More rubber is thus exposed on the side surfaces 36, 38 resulting in an increased coefficient of friction. Accordingly, wear is reduced, transmission efficiency is maintained, and noise generation becomes insignificant.

To verify the above, the following dynamic testing was conducted using the inventive belt.

A V-ribbed belt (3PK1100) was made using 10 parts by weight meta-type aramid fiber 40. The fibers 40 had a length of 3 mm and were present in an amount of 10 weight parts per 100 weight parts of rubber. 5 weight parts of pulp-like, para-type aramid fiber 42 were incorporated per 100 weight parts of rubber.

Figure 3:
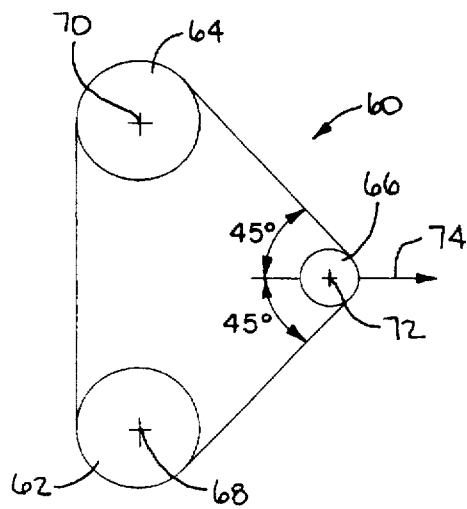
FIG. 3 is a schematic illustration of a system for dynamically testing the power transmission capability of a belt.

Test data was taken for the belt both before and after running on the dynamic system at 60 in FIG. 3. The system 60 included a drive pulley 62, a driven pulley 64 and a tensioning pulley 66. The pulleys 62, 64, 66 were rotated about substantially parallel axes 68, 70, 72, respectively. The drive pulley 62 had a 120 mm diameter, the driven pulley 64 a 120 mm diameter, and the tensioning pulley 66 a 45 mm diameter. The drive pulley 62 was rotated at 4900 rpm, with the load on the driven shaft being 12 PS. A tension of 559N was applied in the direction of the arrow 74. The system was operated with the temperature at 85° C.

The belt was examined both prior to, and after, being run for 48 hours on the system in FIG. 3.

Figure 4:
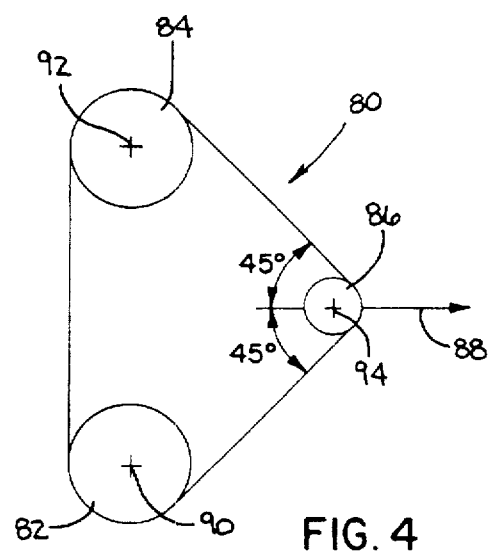
FIG. 4 is a schematic illustration of a dynamic test system for measuring slip ratio with respect to load for a belt.

Slippage measurements were taken after running each belt on the system shown at 80 in FIG. 4 for 48 hours. The system 80 included a drive pulley 82 having a 120 mm diameter, a driven pulley 84 having a 120 mm diameter, and a tensioning pulley 86, having a 45 mm diameter with a tension of 208N applied thereto in the direction of the arrow 88. The pulleys 82, 84, 86 were rotated about substantially parallel axes 90, 92, 94, respectively. The system-was operated at room temperature and the slip ratio with respect to each load was measured, with the results being shown in FIG. 5.

Figure 5:
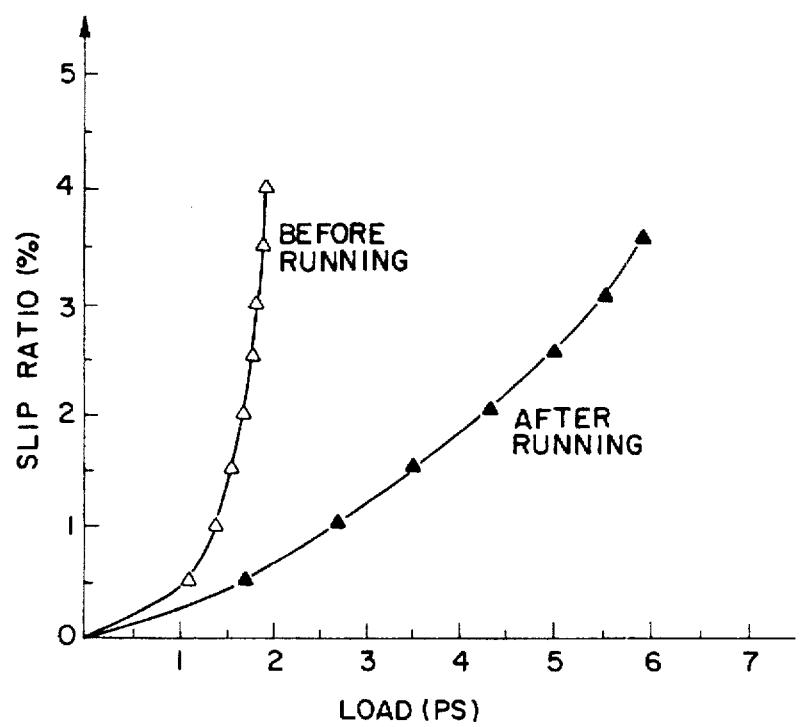
FIG. 5 is a graph of slip ratio for different loads on a belt.

Analyzing the data in FIG. 5, it can be seen that the slip ratio with respect to the load is larger after being run for 48 hours than prior to running. It is assumed that this is due to the fact that, prior to running on the system 80, the short fibers protruding from the side surfaces of the belt are not buried in the rubber and separate from the belt after running.

In the case of a power transmission system having no tensioning device, a decrease in tension occurs as the belt conforms to the pulley grooves i.e. seats, with the result that the slip ratio tends to increase. With the inventive belt, as the belt seats, i.e. moves further radially inwardly in the pulley groove, the short fibers separate from the belt so that the decrease in tension is compensated for by an increase in frictional coefficient.

Description of the Preferred Embodiment

Figure 6:
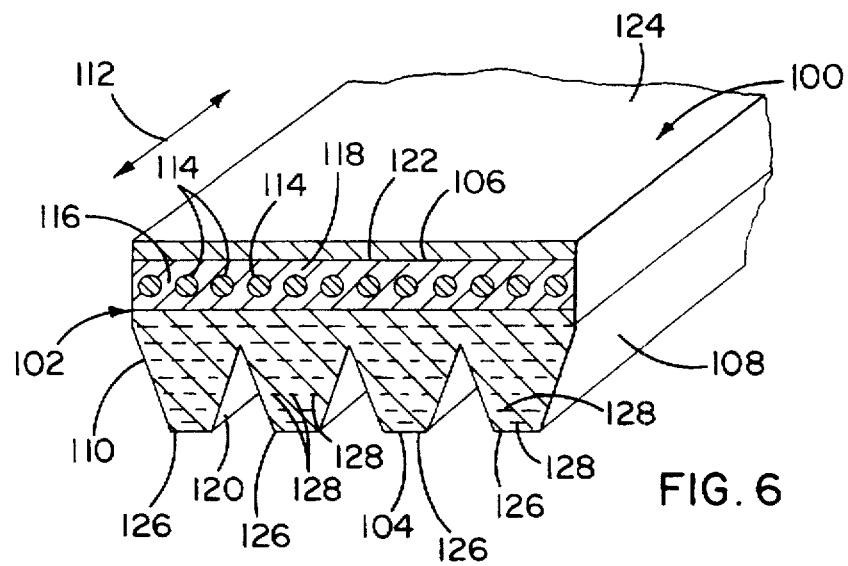
FIG. 6 is a fragmentary, perspective view of a modified form of V-ribbed power transmission belt according to the present invention.

A modified form of V-ribbed belt, according to the present invention, is shown at 100 in FIG. 6. The belt 100 has a body 102 with an inside 104, an outside 106 and laterally spaced, oppositely facing, side surfaces 108, 110. The belt 100 has a length in the direction of the double-headed arrow 112.

A plurality of laterally spaced, longitudinally extending, load carrying cords 114 are embedded in a cushion rubber layer 116 on the body 102. The rubber in the cushion rubber layer 116 is preferably any one of natural rubber (NR), styrene-butadiene rubber (SBR), chloroprene rubber (CR), nitrile rubber (NBR), hydrogenated nitrile rubber (HNBR), chlorosulphonated polyethylene rubber (CSM), polyurethane, and the like, or a blend thereof.

The load carrying cords 114 are preferably formed from a low elongation, high strength rope, made preferably from at least one of polyester, nylon, aramid, carbon, glass fiber, or the like.

A tension section 118 is defined outside of the load carrying cords 114, with a compression section 120 defined inside of the load carrying cords 114. The outside surface 122 of the tension section 118 of the body 102 is covered by a rubber impregnated canvas layer 124. Multiple layers 124 could be utilized.

A plurality of laterally spaced, longitudinally extending ribs 126 are formed in the compression section 120.

In a preferred form, the compression section 120 is made from hydrogenated nitrile rubber (HNBR). Short, reinforcing, aramid fibers 128 are embedded in the ribs 126. The fibers 128 preferably are present in an amount of 5–15 parts by weight of fiber per 100 parts by weight of rubber. The fibers 128 preferably have a length of 1–3 mm, with a diameter of 0.7 to 0.9 denier. The lengths of the fibers 128 are aligned widthwise of the belt body 102.

It has been found that if the diameter of the fibers 128 is less than 0.7 denier, the fibers 128 become so small that they tend to entangle. As a result, there is a poor dispersion of the fibers 128 in the ribs 126. On the other hand, fibers 128 having a diameter of greater than 0.9 denier substantially increase bending resistance, as a result of which the ribs 126 are prone to crack development.

Short fibers 128 having a length less than 1 mm have been found not to provide the desired amount of reinforcement and lateral pressure resistance on the side surfaces 108, 110. Fibers 128 having a length of greater than 3 mm do not disperse evenly in the ribs 126.

If the quantity of the fibers 128 in the ribs 126 is less than 5 parts by weight per 100 parts by weight of rubber, wear resistance is detrimentally decreased. If the amount of fiber 128 is greater than 15 parts by weight of fiber per 100 parts by weight of rubber, there is an increase in cost in the belt construction. Further, the fibers 128 do not evenly disperse in the rubber in the ribs 126, although wear resistance is maintained with this concentration.

The inventive V-ribbed belt 100 was tested by side-by-side with a conventional V-ribbed belt 130 for durability.

The Inventive Belt

Aramid fibers having a diameter of 0.8 denier were mixed in a concentration of 10 parts by weight of fiber per 100 parts by weight of rubber to define the compression section 120 of the V-ribbed belt 100. The belt formed was a 3PK1100 V-ribbed belt.

Conventional Belt

The conventional belt 130 was formed by mixing aramid fibers having a diameter of 1.5 denier in a concentration of 10 parts by weight of fiber per 100 parts by weight of rubber in the compression section thereof.

Figure 7:
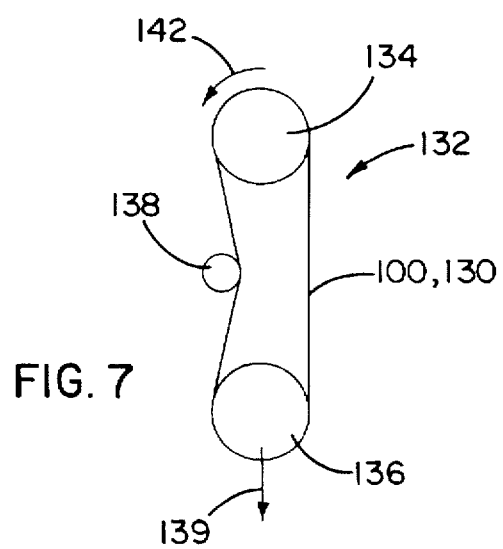
FIG. 7 is a schematic representation of a dynamic test system for the inventive belt.

Each of the belts 100, 130 was operated on a system as shown at 132 in FIG. 7. The system 132 included a 120 mm diameter drive pulley 134 and a 120 mm driven pulley 136. A 50 mm diameter idler pulley 138 was pressed against the outside surfaces of the belts 100, 130 trained around the pulleys 134, 136, with a tension applied in the direction of the arrow 139 so that the belt tension was 60 kgf/3 PK.

The drive pulley 134 was driven in the direction of the arrow 142 at a rotational speed of 3600 rpm. The life of each of the belts 100, 130 was measured.

It was determined that the life of the inventive belt 100 was 400 hours, with the conventional belt 130 lasting 290 hours. Thus, the life of the inventive belt 100 was approximately 1.4 times longer than that of the conventional belt 130.

The foregoing disclosure of specific embodiments is intended to be illustrative of the broad concepts comprehended by the invention.

We claim:

1. A power transmission belt comprising:

a body having a length, an inside, an outside, and laterally spaced side surfaces, said body having a compression section; and a plurality of fibers embedded in the compression section, with each fiber in the plurality of fibers having a diameter of 0.7 to 0.9 denier.

2. The power transmission belt according to claim 1 wherein the compression section comprises hydrogenated nitrile rubber and the plurality of fibers are embedded in the hydrogenated nitrile rubber.

3. The power transmission belt according to claim 2 wherein the plurality of fibers comprise aramid fibers.

4. The power transmission belt according to claim 3 wherein the power transmission belt is a V-ribbed belt having a plurality of laterally spaced ribs and the plurality of fibers is in the laterally spaced ribs.

5. The power transmission belt according to claim 4 wherein there is a load carrying member extending lengthwise of the body and embedded in a cushion rubber layer on the body.

6. The power transmission belt according to claim 1 wherein the plurality of fibers are embedded in rubber.

7. The power transmission belt according to claim 1 wherein the fibers in the plurality of fibers each have a length extending laterally with respect to the body.

8. The power transmission belt according to claim 5 wherein the rubber in the cushion rubber layer is at least one of natural rubber (NR), styrene-butadiene rubber (SBR), chloroprene rubber (CR), nitrile rubber (NBR), hydrogenated nitrile rubber (HNBR), chlorosulphonated polyethylene rubber (CSM), and polyurethane.

9. The power transmission belt according to claim 2 wherein the plurality of fibers are present in an amount of 5 to 15 parts by weight of fiber per 100 parts by weight of hydrogenated nitrile rubber.

10. The power transmission belt according to claim 2 wherein the fibers in the plurality of fibers have a length of 1 to 3 mm.

11. A power transmission belt comprising:

a body having a length, an inside, an outside, and laterally spaced side surfaces, there being a plurality of laterally spaced ribs on the body extending lengthwise of the body; and a plurality of fibers in the ribs and having a diameter of 0.7 to 0.9 denier.

12. The power transmission belt according to claim 11 wherein the ribs comprise hydrogenated nitrile rubber and the plurality of fibers is embedded in the hydrogenated nitrile rubber.

13. The power transmission belt according to claim 11 wherein the plurality of fibers comprise aramid fibers.

14. The power transmission belt according to claim 11 wherein there are a plurality of laterally spaced load carrying cords embedded in the body.

15. The power transmission belt according to claim 14 wherein there is a cushion rubber layer outside of the laterally spaced ribs and the load carrying cords are embedded in the cushion rubber layer.

16. The power transmission belt according to claim 15 wherein the rubber in the cushion rubber layer is at least one of natural rubber (NR), styrene-butadiene rubber (SBR), chloroprene rubber (CR), nitrile rubber (NBR), hydrogenated nitrile rubber (HNBR), chlorosulphonated polyethylene rubber (CSM), and polyurethane.

17. The power transmission belt according to claim 11 wherein the fibers in the plurality of fibers each have a length extending laterally with respect to the body.

18. The power transmission belt according to claim 11 wherein the plurality of fibers is embedded in rubber in the body in an amount of 5 to 15 parts by weight of fiber per 100 parts by weight of rubber.

19. The power transmission belt according to claim 18 wherein the rubber in which the plurality of fibers is embedded comprises hydrogenated nitrile rubber.

20. The power transmission belt according to claim 11 wherein the fibers in the plurality of fibers have a length of 1 to 3 mm.

* * * * *